US006396414B1

(12) United States Patent
Bickford et al.

(10) Patent No.: US 6,396,414 B1
(45) Date of Patent: May 28, 2002

(54) RETRACTABLE ELECTRICAL/OPTICAL CONNECTOR

(75) Inventors: Gary P. Bickford; Joseph F. Cordera, both of Houston, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 0 days.

(21) Appl. No.: 09/198,674

(22) Filed: Nov. 23, 1998

(51) Int. Cl.[7] .................................................. G01V 3/00

(52) U.S. Cl. ................................ 340/855.2; 340/855.1; 174/69; 174/47

(58) Field of Search .............................. 174/28, 47, 69, 174/102 R, 107; 340/855.1, 854.9, 855.2; 439/191

(56) References Cited

U.S. PATENT DOCUMENTS

| | | | | | |
|---|---|---|---|---|---|
| 3,742,363 | A | * | 6/1973 | Carle | 174/102 R |
| 3,904,840 | A | * | 9/1975 | Kostelnicek | 340/855.1 |
| 4,095,865 | A | * | 6/1978 | Denison et al. | 439/191 |
| 4,154,976 | A | * | 5/1979 | Brorein | 174/115 |
| 4,453,035 | A | * | 6/1984 | Neuroth | 174/28 |
| 4,827,081 | A | * | 5/1989 | Seaboourne | 174/139 |
| 5,189,719 | A | * | 2/1993 | Coleman | 385/101 |
| 5,191,173 | A | * | 3/1993 | Sizer et al. | 174/105 R |
| 5,569,883 | A | * | 10/1996 | Walter | 174/84 R |
| 5,708,235 | A | * | 1/1998 | Falciglia | 174/112 |
| 5,739,472 | A | * | 4/1998 | Buck | 174/28 |
| 5,778,652 | A | * | 7/1998 | Kunze | 57/235 |
| 5,821,452 | A | * | 10/1998 | Neuroth | 174/28 |
| 5,920,032 | A | * | 7/1999 | Aeschbacker et al. | 174/47 |

* cited by examiner

*Primary Examiner*—Michael Horabik
*Assistant Examiner*—Albert K. Wong
(74) *Attorney, Agent, or Firm*—Terry D. Morgan; Brigitte L. Jeffery; Wayne Kanak

(57) ABSTRACT

A down-hole tool includes a first and second portion that are moveable relative to one another, but are electrically coupled together. A rigid tube formed into a helical coil extends between the first and second portions. The helical coil is expandable and compressible in response to movement between the first and second portions. A conductor is positioned within the helically wound tube and is adapted to pass electrical signals between the first and second portions.

21 Claims, 3 Drawing Sheets

RETRACTABLE ELECTRICAL/OPTICAL CONNECTOR

BACKGROUND OF THE INVENTION

1. Field of the Invention

The present invention is generally related to flexible electrical connectors, and, more particularly, to a helical spring shaped electrical connector useable in a high-temperature environment.

2. Description of the Related Art

Electronic devices are commonly formed from a plurality of parts that may be moveable relative to one another, but need to be electrically joined together. For example, a telephone normally consists of a base unit and a handset joined together by an electrical connector, such as a cable. Ordinarily, the telephone cable is formed in a helical coil so that it is at least somewhat self-storing. That is, telephone cables as long as 20 feet may be useful to provide a limited range of mobility to the telephone user; however, storing 20 feet of cable may be inconvenient and cumbersome. The helical construction of the cable is expandable/compressible so that when not in use, a large quantity of cable can be stored in a relatively small area, and when in use, the cable can be dramatically expanded to extend the range of use of the telephone.

Other electronic devices are constructed from multiple moveable parts that would benefit from an expandable/compressible connection, such as that used in a telephone. For example, tools used in the well drilling/logging industry are routinely constructed from multiple moving parts that may need to be electrically connected together. Tools used in the well drilling/logging industry are commonly exposed to high-temperature environments that would adversely impact the materials used to construct ordinary telephone cables. That is, high temperature reduces the ability of the cable to return to a compressed state after being expanded. Moreover, ordinary telephone cables are relatively flexible and tend to sag under their own weight, particularly when installed horizontally. This sagging and failure to return to a compressed state can result in the cable interfering with the movement and operation of the tool, and may even cause damage or destruction of the cable.

The present invention is directed to a method and apparatus that solves or reduces some or all of the aforementioned problems.

SUMMARY OF THE INVENTION

In one aspect of the present invention, a method is provided for forming a helical connection. The method includes inserting a conductor through a rigid tube. Thereafter, the tube is wound in a helical configuration, and then annealed.

In another aspect of the present invention, a helical connection is provided. The helical connection includes a rigid tube formed into a helical coil than annealed, and a conductor positioned within the helically wound tube.

BRIEF DESCRIPTION OF THE DRAWINGS

The invention may be understood by reference to the following description taken in conjunction with the accompanying drawings, in which like reference numerals identify like elements, and in which.

Figure 1:
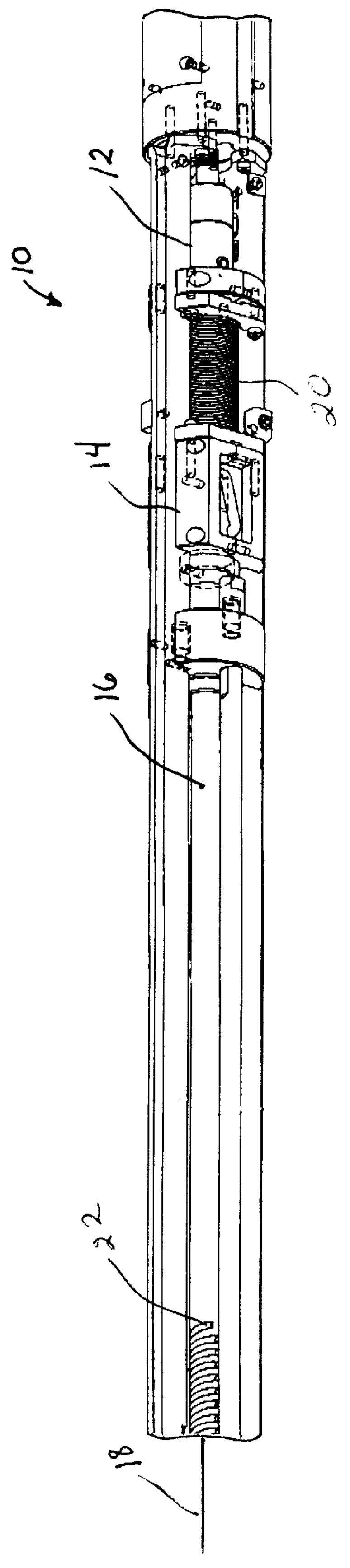
FIG. 1 is an interior perspective view of a portion of a down-hole tool in a compressed configuration.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Turning now to the drawings, and in particular to FIG. 1, an interior perspective view of a portion of a down-hole tool 10 is shown in a compressed configuration. The down-hole tool 10 includes a fixed portion 12 coupled to a moveable portion 14 via a ball-screw device 16. As is conventional, rotation of the ball-screw device 16 is effected by rotation of a motor (not shown), which causes the moveable portion 14 to translate along a longitudinal axis 18 of the down-hole tool 10.

Figure 2:
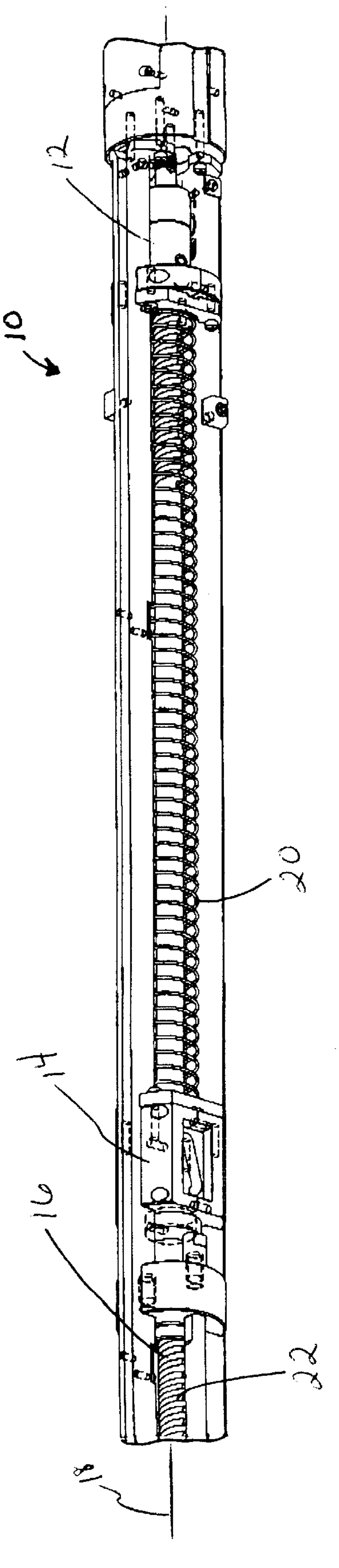
FIG. 2 is an interior perspective view of the down-hole tool in an expanded configuration.

In the illustrated embodiment, it is useful for an electrical and/or optical connection 20 to exist between the fixed and moveable portions 12, 14. The connection 20 may be used to supply electrical power and/or communication signals between the fixed and moveable portions 12, 14. In the illustrated embodiment, the connection 20 is formed in a helical configuration so that it can expand and contract as dictated by movement of the fixed and moveable portions 12, 14. As shown in FIG. 2, the down-hole tool 10 is configured so that the moveable portion 14 can be translated a significant distance along the longitudinal axis 18. For example, in one embodiment the helical connection 20 is expandable by about 600% relative to its compressed configuration.

For ease of illustration, the ball screw device 16 is shown with only a portion of its longitudinal surface having a helical groove 22 formed therein. In the actual embodiment, the helical groove 22 extends along the entire length of the ball screw device 16 so as to permit movement of the moveable portion 14 along the corresponding length of the ball screw device. The down-hole tool 10 illustrated in FIGS. 1 and 2 is commonly used in horizontal bore-holes. Thus, any sagging in the connection 20, particularly in the expanded configuration of FIG. 2, can result in the coils of the connection 20 being inadvertently captured and damaged by the helical groove 22. Likewise, any failure of the helical connection 20 to return to its fully compressed configuration, as shown in FIG. 1, can also result in damage and ultimate failure of the helical connection 20. The helical connection 20 needs to meet the competing requirements of being capable of substantial non-deforming expansion (600% in the illustrated embodiment) while not experiencing substantial sagging.

Figure 3:
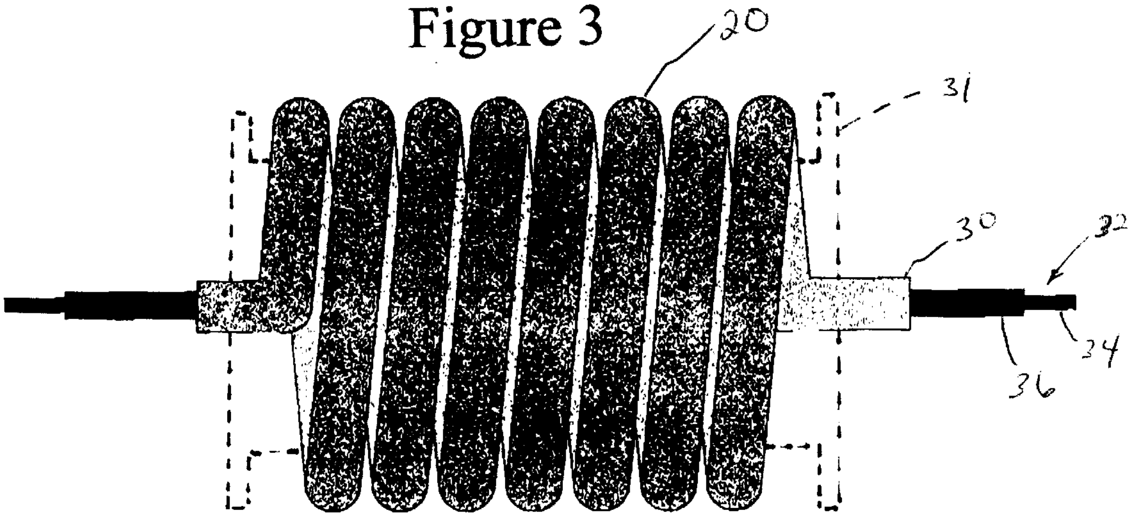
FIG. 3 is a side view of a helically coiled electrical connector of FIGS. 1 and 2 in a stage of manufacture.
Figure 1:
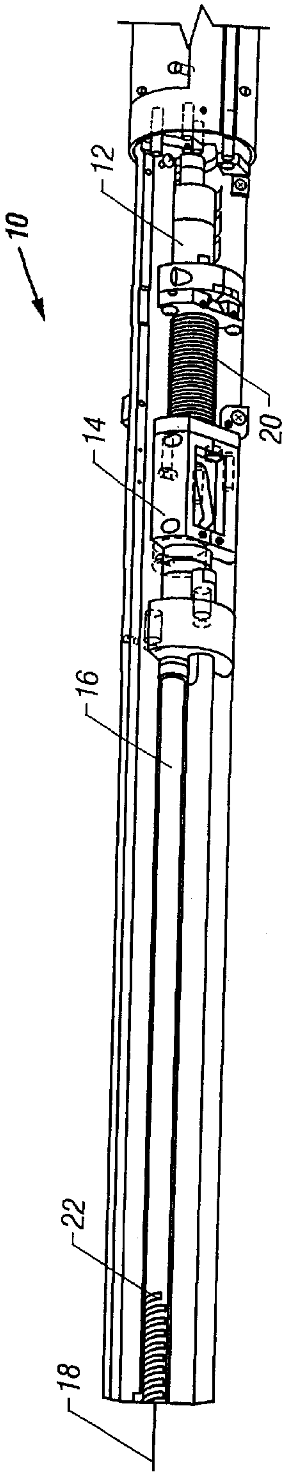
Figure 2:
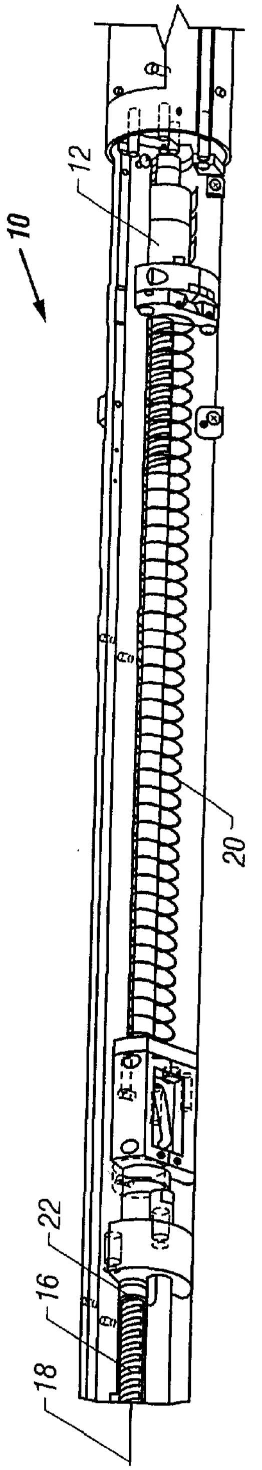
Figure 3:
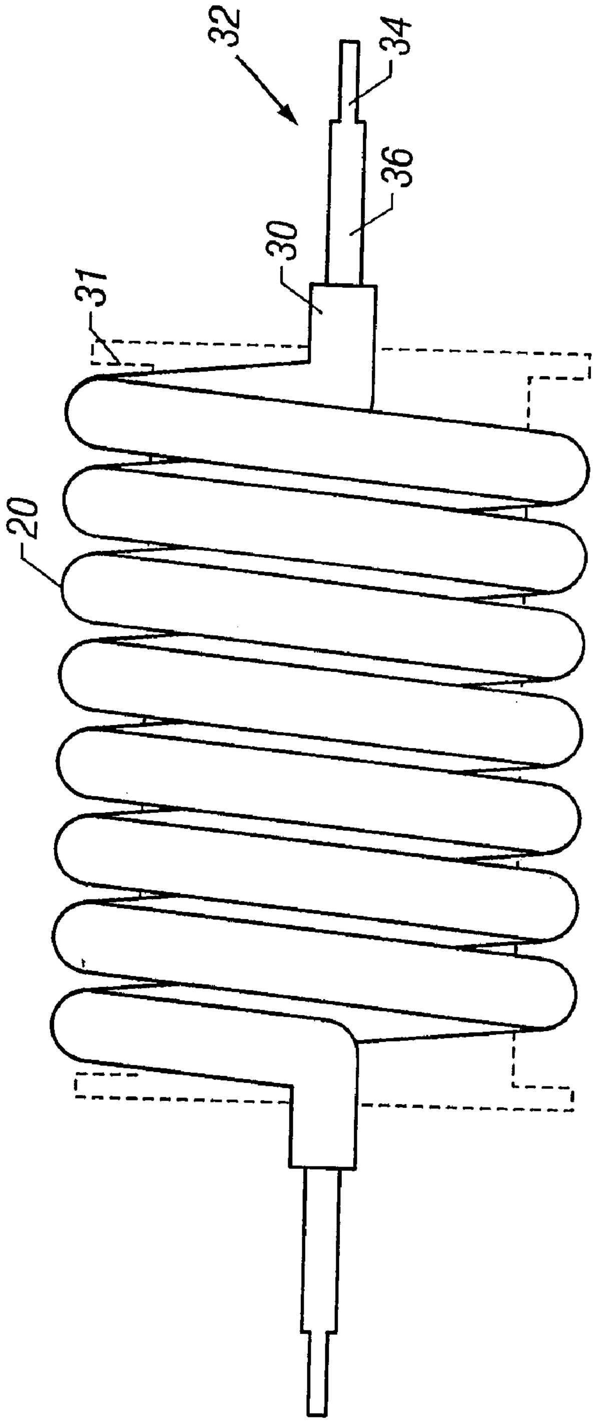

Turning now to FIG. 3, a side view of one embodiment of the helical connection 20 is shown. A relatively stiff but deformable tube 30 is shown helically wound about a mandrell 31 during a stage of manufacture of the helical connection 20. Prior to being helically wound about the mandrell 31, a conductor 32 is inserted through the tube 30. The conductor 32 can take on any of a variety of configurations, including but not limited to electrically conductive and fiber optic materials. In one embodiment, the conductor 32 includes an electrically conductive metal 34, such as copper or tin copper, surrounded by an insulator 36, such as TFE. In one embodiment, the conductor 32 is 26 awg TFE wire.

The tube 30 may likewise be constructed of a variety of materials and sizes, as dictated by the particular application. In one embodiment, the tube 30 is constructed from stainless steel. The tube 30 may be constructed having a variety of different inner and outer diameters, which may affect the resulting fatigue life, stiffness, deformation characteristics, and durability of the resultant spring. Table I illustrates the relationship between the wall thickness of the tube 30 and the stress experienced by the tube 30 during movement through its expected range of travel.

TABLE 1

| Tube OD | % of Ultimate Tensile Strength | Tube ID |
|---|---|---|
| 0.04 | 0.159604 | 0.038 |
| 0.041 | 0.167687 | 0.038 |
| 0.042 | 0.175973 | 0.038 |
| 0.043 | 0.184462 | 0.038 |
| 0.044 | 0.193155 | 0.038 |
| 0.045 | 0.202052 | 0.038 |
| 0.046 | 0.211153 | 0.038 |
| 0.047 | 0.220458 | 0.038 |
| 0.048 | 0.229967 | 0.038 |
| 0.049 | 0.239682 | 0.038 |
| 0.05 | 0.249601 | 0.038 |
| 0.051 | 0.259725 | 0.038 |
| 0.052 | 0.270055 | 0.038 |
| 0.053 | 0.28059 | 0.038 |
| 0.054 | 0.291331 | 0.038 |
| 0.055 | 0.302278 | 0.038 |
| 0.056 | 0.313432 | 0.038 |
| 0.057 | 0.324792 | 0.038 |
| 0.058 | 0.336358 | 0.038 |
| 0.059 | 0.348132 | 0.038 |
| 0.06 | 0.360113 | 0.038 |

To maximize fatigue life of the spring, it is desirable to select a wall thickness that produces a stress level within the range of about 25–30% of the ultimate tensile strength of the tube 30. As can be seen from Table I, tubes falling within the outer diameter range of about 0.05–0.055 inches should maximize the fatigue life of the spring. It was also observed that this same group of tubes produced springs that were sufficiently rigid that they resisted sagging over the desired range of movement.

The conductor 32 is inserted through the tube 30 while the tube 30 is relatively straight, i.e., prior to forming the helical coil. Before inserting the conductor 32 into the tube 30, the ends of the tube 30 are flared to reduce the possibility of damage to the conductor 32 as it is fed through the tube 30. A wire (not shown) having a substantially small diameter is fed through the tube 30. The wire is then used to pull the 26 awg TFE wire 32 through the tube 30.

The assembled tube 30 and conductor 32 are next formed into a helical coil. The tube 30 is helically wrapped under tension around the mandrel 31 to form the spring, as shown in FIG. 3. In one embodiment, the mandrel 31 has a diameter of about 0.75 inches. A heating process normalizes residual stresses in the tube 30. Thereafter, the tension is released, and the tube 30 is allowed to unwind slightly. In one embodiment, the coiled tube 30 is heated for a predetermined time and temperature to anneal the tube.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for forming a helical connection, comprising:

inserting a conductor through a rigid tube;

winding the tube in a helical configuration; and annealing the tube, the tube made from a material adapted, when annealed, to enable substantial expansion along an axis of the helical configuration when stretched, the tube adapted to return to the helical configuration when retracted.

2. A method, as set forth in claim 1, wherein inserting the conductor through a rigid tube includes inserting the conductor through a metallic tube.

3. A method, as set forth in claim 2, wherein inserting the conductor through a metallic tube includes inserting the conductor through a stainless steel tube.

4. A method, as set forth in claim 3, wherein annealing the tube includes heating the tube at a temperature and time sufficient to normalize residual stresses in the tube.

5. A method, as set forth in claim 4, wherein inserting the conductor through the stainless steel tube includes inserting an insulated wire through the rigid tube, where the insulation is sufficient to resist breakdown caused by the annealing.

6. A method, as set forth in claim 5, wherein inserting the insulated wire includes inserting a TFE coated wire.

7. A helical connection, comprising:

A rigid tube formed into a helical coil then annealed, the tube made from a material adapted, when annealed, to enable substantial expansion along an axis of the helical configuration when stretched, the tube adapted to return to the helical configuration when retracted; and a conductor positioned within said annealed, helically wound tube.

8. A helical connection, as set forth in claim 7, wherein said rigid tube is formed of a metal.

9. A helical connection, as set forth in claim 8, wherein said rigid tube is formed from stainless steel.

10. A helical connection, as set forth in claim 7, wherein said rigid tube has a wall thickness that produces a stress in the range of about 25–30% of the ultimate tensile strength of the tube during a desired range of movement.

11. A helical connection, as set forth in claim 10, wherein said rigid tube has an inner diameter of about 0.038 inches and an outer diameter in the range of about 0.050–0.055 inches.

12. A helical connection, as set forth in claim 7 wherein said conductor has an insulator formed thereon sufficient to resist breakdown caused by the annealing.

13. A helical connection, as set forth in claim 12 wherein said insulator is TFE.

14. A down-hole tool, comprising:

a first portion;

a second portion;

a rigid tube formed into a helical coil extending between said first and said second portions, said helical coil maintaining a helical form and functioning as a spring while being expanded and compressed in response to movement between said first and said second portions; and a conductor positioned within said helically wound tube and adapted to pass electrical signals between said first and second portions.

15. A down-hole tool, as set forth in claim 14, wherein said rigid tube is formed of a metal.

16. A down-hole tool, as set forth in claim 15, wherein said rigid tube is formed from stainless steel.

17. A down-hole tool, as set forth in claim 14, wherein said rigid tube has a wall thickness that produces a stress in the range of about 25–30% of the ultimate tensile strength in the tube during a desired range of movement.

18. A down-hole tool, as set forth in claim 17, wherein said rigid tube has an inner diameter of about 0.038 inches and an outer diameter in the range of about 0.050–0.055 inches.

19. A down-hole tool, as set forth in claim 14, wherein said coiled rigid tube has been annealed.

20. A down-hole tool, as set forth in claim 19, wherein said conductor has an insulator formed thereon sufficient to resist breakdown caused by the annealing.

21. A down-hole tool, as set forth in claim 20, wherein said insulator is TFE.

* * * * *

UNITED STATES PATENT AND TRADEMARK OFFICE

CERTIFICATE OF CORRECTION

PATENT NO. : 6,396,414 B1
DATED : May 28, 2002
INVENTOR(S) : Gary P. Bickford et al.

It is certified that error appears in the above-identified patent and that said Letters Patent is hereby corrected as shown below:

Title page, should be deleted to be replaced with the attached title page.

Drawing sheets, consisting of Figs. 1 - 3, should be deleted to be replaced with the drawing sheets as shown on the attached pages.

Signed and Sealed this

Seventeenth Day of June, 2003

JAMES E. ROGAN
*Director of the United States Patent and Trademark Office*

(12) United States Patent
Bickford et al.

(10) Patent No.: US 6,396,414 B1
(45) Date of Patent: May 28, 2002

(54) RETRACTABLE ELECTRICAL/OPTICAL CONNECTOR

(75) Inventors: Gary P. Bickford; Joseph F. Cordera, both of Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/198,674

(22) Filed: Nov. 23, 1998

(51) Int. Cl.$^{7}$ .................................................. G01V 3/00
(52) U.S. Cl. ................................ 340/855.2; 340/855.1; 174/69; 174/47
(58) Field of Search .............................. 174/28, 47, 69, 174/102 R, 107; 340/855.1, 854.9, 855.2; 439/191

(56) References Cited

U.S. PATENT DOCUMENTS

| | | | | | |
|---|---|---|---|---|---|
| 3,742,363 | A | * | 6/1973 | Carle | 174/102 R |
| 3,904,840 | A | * | 9/1975 | Kostelnicek | 340/855.1 |
| 4,095,865 | A | * | 6/1978 | Denison et al. | 439/191 |
| 4,154,976 | A | * | 5/1979 | Brorein | 174/115 |
| 4,453,035 | A | * | 6/1984 | Neuroth | 174/28 |
| 4,827,081 | A | * | 5/1989 | Seaboourne | 174/139 |
| 5,189,719 | A | * | 2/1993 | Coleman | 385/101 |
| 5,191,173 | A | * | 3/1993 | Sizer et al. | 174/105 R |
| 5,569,883 | A | * | 10/1996 | Walter | 174/84 R |
| 5,708,235 | A | * | 1/1998 | Falciglia | 174/112 |
| 5,739,472 | A | * | 4/1998 | Buck | 174/28 |
| 5,778,652 | A | * | 7/1998 | Kunze | 57/235 |
| 5,821,452 | A | * | 10/1998 | Neuroth | 174/28 |
| 5,920,032 | A | * | 7/1999 | Aeschbacker et al. | 174/47 |

* cited by examiner

*Primary Examiner*—Michael Horabik
*Assistant Examiner*—Albert K. Wong
(74) *Attorney, Agent, or Firm*—Terry D. Morgan; Brigitte L. Jeffery; Wayne Kanak

(57) ABSTRACT

A down-hole tool includes a first and second portion that are moveable relative to one another, but are electrically coupled together. A rigid tube formed into a helical coil extends between the first and second portions. The helical coil is expandable and compressible in response to movement between the first and second portions. A conductor is positioned within the helically wound tube and is adapted to pass electrical signals between the first and second portions.

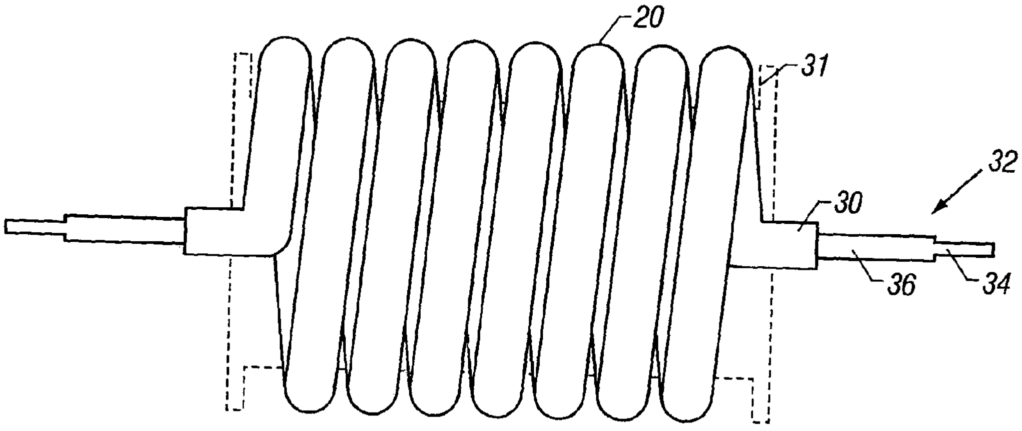

21 Claims, 3 Drawing Sheets